March 29, 1966 M. LEICHSENRING 3,243,773
CONTROL MEANS FOR THE SELECTIVE ENERGIZATION OF AN ELECTRICALLY
ENERGIZABLE DEVICE FROM AN ELECTRICAL POTENTIAL SOURCE
Filed April 29, 1965
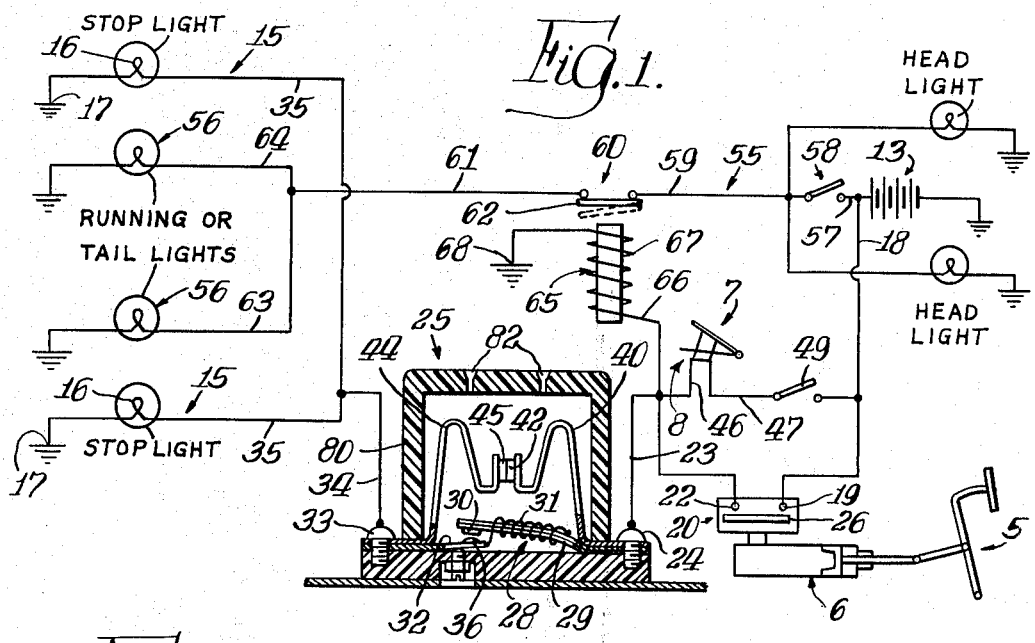
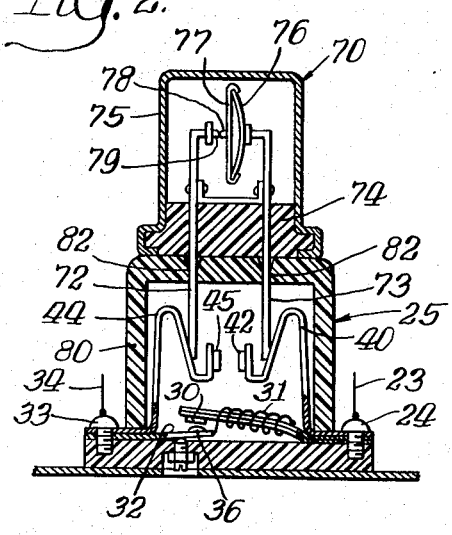
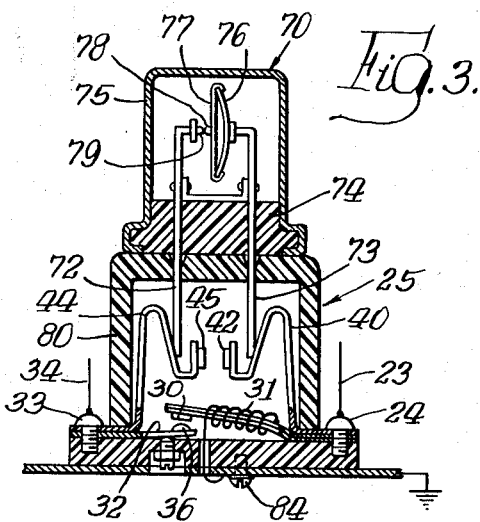
Inventor:-
Max Leichsenring

United States Patent Office 3,243,773
Patented Mar. 29, 1966

3,243,773
CONTROL MEANS FOR THE SELECTIVE ENERGIZATION OF AN ELECTRICALLY ENERGIZABLE DEVICE FROM AN ELECTRICAL POTENTIAL SOURCE
Max Leichsenring, 4525 N. Francisco St., Chicago, Ill.
Filed Apr. 29, 1965, Ser. No. 451,773
9 Claims. (Cl. 340—72)

The present invention relates to control means for use between an electrical potential source and an electrically energizable device embodying adaptor means to provide for the predetermined selective energization of the latter.

The present invention has utility for a wide variety of uses as, for example, with the brake and/or accelerator systems of automotive vehicles.

In my prior Patent No. 3,164,803 dated January 5, 1965, there is disclosed control means for association with the brake system of an automotive vehicle in which a steady warning signal is normally effected by actuation of the vehicle brakes with provisions being made for an initial limited period of intermittent energization of the warning signal followed thereafter by a steady energization of the warning signal, and, if desired, re-establish the intermittent energization of the warning signal after steady signal has been effected a predetermined length of time, and with such alternate intermittent and steady signals being given until the brakes of the vehicle are released. Signalling of the character noted is of advantage in the alerting of a trailing motorist that a lead vehicle is being braked.

The control means of my present invention embodies adaptor means for incorporation in circuit means between a warning signal for a vehicle and a source of electrical potential to provide upon application of the vehicle brakes and/or predetermined change in position of the accelerator for controlling the engine of the vehicle for steady energization of the warning signal, and with which adaptor means of cyclic switch means may be detachably associated to provide for intermittent energization of the warning signal for a predetermined period of time followed by steady energization of the warning signal, and, if desired, subsequent alternate intermittent and steady energization of the warning signal.

It is an object of the present invention to provide adaptor means of the character aforenoted having electrical actuating means for association in series between an electrically energizable device, such as a filament of a warning signal, and a source of electrical potential, and embodying contact means adapted when electrically connected for shunting such electrical actuating means to electrically connect the electrical potential source and electrically energizable device independently of the electrical actuating means.

A further object is to provide adaptor means of the character last noted with which cyclic switch means may be detachably associated, and which cyclic switch means and electrical actuating means provides at different times for the intermittent and steady energization of the electrically energizable device.

A further object is to provide control means for a vehicle having brake means for braking the vehicle and embodying signal means having an electrically energizable filament connected in circuit means with an electrical potential source, together with a normally open main control switch in the circuit means having connection with the brake means and being adapted to be closed upon application of the brake means characterized by the provision of adaptor means embodying time delay electrical actuating means connected in series in a circuit means and energizable by current flow therethrough from the source of potential, and normally closed contact means in series with the circuit means and in shunt relation with the time delay electrical actuating means, and with which adaptor means cyclic switch means is adapted to be detachably connected for opening the contact means of the adaptor means and with such cyclic switch means and the time delay electrical actuating means providing at different times for the intermittent and steady energization of the filament of the signal means.

A further object of the invention is to provide control means as last described for an engine powered vehicle embodying accelerator means for controlling the engine of the vehicle, and in which predetermined movement of the accelerator means effects energization of the cyclic switch means and the time delay electrical actuating means to provide at different times for the aforementioned intermittent and steady energization of the signal filament.

A further object of the invention is to provide control means as last noted embodying second circuit means in parallel with the first related circuit means, second signal means comprising second filament means in the second circuit, normally closed switch means in the second circuit means, and means in the first circuit means for opening the last named switch means upon application of the brakes of the vehicle or upon predetermined movement of the accelerator means.

The above and other objects and advantages of my invention will appear from the following detailed description of certain preferred embodiments of the invention.

Now in order to acquaint those skilled in the art with the manner of constructing control systems and adaptors therefore in accordance with my invention I shall describe in connection with the accompanying drawings certain preferred embodiments of my invention.

In the drawings:

FIGURE 1 is a diagrammatic illustration of control means embodying adaptor means according to one embodiment of the invention;

FIGURE 2 is a vertical sectional view of the adaptor means shown embodied in the electrical circuit of FIGURE 1 together with cyclic switch means associated therewith; and FIGURE 3 is a detail vertical sectional view conforming largely to FIGURE 2 in an arrangement providing for initial intermittent flashing of a warning signal followed by a steady energization of the warning signal.

Referring now to FIGURE 1 of the drawings, there is shown control means in accordance with the principles of the present invention which may be embodied in a conventional engine powered automotive vehicle equipped with brakes. According to conventional practice a brake pedal 5 through a master fluid cylinder 6 provides for application of the vehicle brakes, and accelerator means 7, embodying switch means indicated generally at 8, is operative in a known manner for controlling the speed of the engine of the vehicle. The accelerator means 7 may be constructed in accordance with the principles of my prior patent No. 3,171,917, dated March 2, 1965, in which the contact means at 8 are closed upon predetermined movement of the accelerator pedal in power decreasing direction to energize signal means hereinafter described to alert a trailing motorist in accordance with the mode of operation described in my last referred to patent.

As shown in FIGURE 1 first circuit means extends from a source of potential 13, such as a conventional storage battery, to one electrically energizable device, such as at 15, which may comprise brake signals embodying electrically energizable filaments 16 connected to ground as at 17. The first circuit means comprises a first lead 18 extending from one terminal of the storage battery 13 to a first contact 19 of first control or brake switch means 20 which embodies a second contact 22 from which a lead 23 extends to one terminal 24 of adaptor means 25 of the present invention. The first control or brake switch means 20 embodies a switch blade 26 which is adapted to be moved to position connecting contact 19 and 22 upon application of the brake pedal 5 in known manner. The adaptor means 25 as shown comprises electrical actuating means indicated generally at 28 which in the embodiment shown affords a time delay electrical actuating means connected in series relation in the first circuit means. The time delay electrical actuating means 28 comprises a bi-metal blade 29 electrically connected to terminal 24 and at its outer end carries a contact 30. A resistance coil 31 is electrically connected at one end to the bi-metal blade 29 adjacent the terminal 24 and at its other end to a plate member 32 connected to terminal 33 from which a lead 34 extends to branch leads 35 having connection with filaments 16. The plate member 32 at its inner end is provided with a contact 36 disposed in normal circuit open relation with respect to the contact 30. In the structure thus far described upon closing of the first control switch means 20 current initially flows through the heating coil 31 which will heat the bi-metal blade 29 causing the latter to flex to close contacts 30 and 36 and thus establish a circuit from the storage battery 13 to the filaments 16.

The adaptor means 25 as shown further comprises a first spring metal blade member 40 electrically connected at one end to the terminal 24 and which at its other or outer free end carries a contact 42, and a second spring metal blade 44 which is electrically connected at one end to the terminal 33 and which at its other or outer free end carries a contact 45. The contacts 42 and 45 through spring blade members 40 and 44 are yieldingly biased or disposed in closed or contacting position and in the position shown in FIGURE 1 provide a shunt path around the time delay electrical actuating means 28 providing for completion of a circuit between the source of potential 13 and the filaments 16.

In the circuitry thus far described in connection with FIGURE 1, the adaptor means 25 serves to provide for the energization of the filaments 16 to afford a stop signal for the vehicle upon application of the brake pedal 5.

In connection with the accelerator means 7, it will be noted that it is connected in parallel relation by leads 46 and 47 with the first control or brake switch 20. An ignition switch 49 is preferably embodied in the lead 47 so that upon closing of the ignition switch predetermined movement of the accelerator means 7 closes the contact means 8 as upon predetermined deceleration of the vehicle to energize the filaments 16 and warn a trailing motorist that the vehicle driver is diminishing power input to the engine of the vehicle.

In the circuit of FIGURE 1 second circuit means, indicated generally at 55, may extend from the potential source 13 to second signal means embodying filaments 56. In such circuit a lead 57 extends from the storage battery 13 to a control switch mounted, for example on the dash board of the vehicle, as indicated at 58, and from which a lead 59 extends to contact means indicated at 60 normally closed by an armature 62 and thence through lead 61 to branch leads 63 and 64 to filaments 56 and thence to ground. A solenoid as indicated at 65 has connection by lead 66 extending from the first circuit means posterior of the first control or brake switch means 20 with the lead 66 having connection with a coil 67 of the solenoid and which extends as at 68 to ground. In the organization of parts as above described application of brake pedal 5 or movement of the accelerator means 7 a predetermined extent as aforementioned, effects energization of the coil 67 of the solenoid 65 attracting the armature 62 and opening the circuit at contacts 60 of the second circuit means to de-energize the filaments 56 of desired electrically energizable devices or warning signals.

In the structure as above described, the filaments 16 may serve as stop lights and the filament 56 may constitute tail lights for the vehicle with the operation being such that upon application of the brake or decelerating of the vehicle by predetermined movement of the accelerator means 7 the stop lights are energized and the tail lights de-energized. It will be understood that the stop and tail lights may be of the same or of different colors to provide for appropriate signalling to a trailing motorist of the condition of operation of the vehicle in which the above circuit means and components are embodied.

According to the present invention it is proposed and as best seen in FIGURE 2 to provide for the association of known cyclic switch means as typically illustrated at 70 in detachable connecting relation with respect to the adaptor means 25. In this regard, it will be observed that the cyclic switch means 70 comprises a pair of electrical conductive metal prong members 72 and 73 suitably mounted in an insulated base member 74 of a housing indicated at 75. The prong member 73 at its upper end supports a rectangular blade 76 with respect to which a conductor in the form of resistance ribbon 77 extends across and is secured at its opposite ends to opposite edges of the blade member 76. The conductor 77 provides for the support of a first contact 78. The prong member 72 at its inner end within the casing end carries a second contact 79 opposite the first contact 78. The contacts 78 and 79 are normally in closed position and in such position the resistance ribbon or conductor 77 flexes the blade 76 into an arcuate configuration from its normal flat planar shape to maintain the contacts 78 and 79 engaged. Upon passage of current from conductor 73 through contacts 78 and 79 resistance ribbon or conductor 77 being in series in such circuit elongates and the prestressed blade 76 snaps to a position separating contacts 78 and 79 thus opening the circuit between the conductors 72 and 73. Upon cooling of the resistance ribbon or conductor 77 it contracts, stressing the blade 76 to its arcuate configuration and at which contacts 78 and 79 are again engaged in closed position. Thus, the contacts 79 and 78 are repeatedly opened and closed to provide intermittent energization of the filaments 16 as will be described below in greater detail.

It will be observed that the aforementioned adaptor means 25 comprises a housing 80 preferably of insulating material having openings 82 therein at opposite leg portions of the spring blades 40 and 44. The openings 82 are adapted to receive the projecting ends of the prongs 72 and 73, and with the cyclic switch means 70 mounted on the adaptor means 25 as shown in FIGURE 2, the outer ends of the prongs 72 and 73 separate the contacts 42 and 45 so that in the position of the parts as shown in FIGURE 2, the shunt circuit afforded by contacts 42 and 45 is opened thus establishing the circuit through the time delay electrical actuating means 28. As described in my aforementioned Patent No. 3,164,803, a cyclic switch means, such as shown at 70, mounted with respect of the adaptor means 25 disposes the cyclic switch means circuit in shunt relation with respect to the time delay electrical actuating means 28. As described in the last mentioned patent, upon the application of the brake means 5 on predetermined actuation of the accelerator means 7 as above desribed, provides for connection of the potential source 13 with the filaments 16 through cyclic means 70 effecting the intermittent energization of the filaments 16, and after a predetermined interval dependent on heating of the bi-metal blade 29 as above described to close contacts 30 and 36, the cyclic switch means is shunted to thus provide for steady energization of the filaments 16. In the device as shown in FIGURE 2, the circuit from the potential source 13 to ground is effected through the filaments 16 so that in such arrangement the initial intermittent flashing of the filaments 16 for a predetermined interval is followed by steady energization thereof through time delay actuating means 28.

In FIGURE 3 there is shown another assembly of cyclic switch means 70 and adaptor means 25 all as above described except for the grounding of the heating coil 31 to a ground screw 84 mounted on a metal plate on which the base of the adaptor means 25 is mounted. In such grounding of the heating coil 31 of the time delay actuating means 28, application of the brake pedal 5 or manipulation of the accelerator switch means 7 in the manner above noted provides for the initial intermittent flashing of the filaments 16 followed by steady energization of the filaments 16 through the time delay actuating means 28 until the brake 5 is returned to normal position, or the accelerator means is again depressed in predetermined engine power increasing direction. When the accelerator means is returned to idle position the foregoing circuitry provides for energization of the filaments 16.

While there has been shown and described certain preferred embodiments of the invention, it will be understood that various modifications and rearrangements may be made therein without departing from the spirit and scope of the invention.

I claim:

1. Adaptor means for use with circuit means having connection with a source of electrical potential, main switch means for closing said circuit means, an electrically energizable device in said circuit means, and for association with cyclic switch means adapted to be detachably connected with said adaptor in parallel relation therewith comprising time delay electrical actuating means connected in said circuit means and energizable by current flow therethrough from said source of potential upon closing of said main switch, circuit closing means adapted upon connection of said cyclic switch means therewith to connect the latter in parallel relation with said time delay electrical actuating means, said cyclic switch means upon closing of said main switch means effecting intermittent energization of said electrically energizable device by said source of potential, and said time delay electrical actuating means being energized by current flow from said source of potential after a first predetermined interval of energization of said electrically energizable device through said cyclic switch means for shunting the latter to effect steady energization of said electrically energizable device through said time delay electrical actuating means.

2. The adaptor means of claim 1 characterized by said time delay electrical actuating means being connected to ground through said electrically energizable device in said circuit means whereby said time delay electrical actuating means after a second predetermined interval subsequent to said first predetermined interval rendering shunting of said cyclic switch means ineffective and thereby effect intermittent energization of said electrically energizable device through said cyclic switch means.

3. Adaptor means for use with circuit means having connection with a source of electrical potential, main switch means for closing said circuit means, an electrically energizable device in said circuit means, and for association with cyclic switch means adapted to be detachably connected wtih said adapter in parallel relation therewith comprising time delay electrical actuating means connected in said circuit means and energizable by current flow therethrough from said source of potential upon closing of said main switch, contact means in series in said circuit means and in shunt relation with said time delay electrical actuating means, said cyclic switch means when connected with said adaptor means opening said contact means, said cyclic switch means upon closing of said main switch means effecting intermittent energization of said electrically energizable device by said source of potential, and said time delay electrical actuating means being energized by current flow from said source of potential after a first predetermined interval of energization of said electrically energizable device through said cyclic switch means for shunting the latter to effect steady energization of said electrically energizable device through said time delay electrical actuating means.

4. Adaptor means for use with circuit means extending between a source of electrical potential, an electrically energizable device, and ground and including main switch means for closing the same, and for association with cyclic switch means adapted to be detachably connected with said adaptor in parallel relation therewith, comprising time delay electrical actuating means connected in said circuit means energizable by current flow therethrough from said source of potential upon closing of said main switch, contact means in series with said circuit means and in shunt relation with said time delay electrical actuating means, said cyclic switch means when connected with said adaptor means opening said contact means, said cyclic switch means upon closing of said main switch means effecting intermittent energization of said electrically energizable device by said source of potential, and said time delay electrical actuating means being energized by current flow from said source of potential to ground after a first predetermined interval of energization of said electrically energizable device through said cyclic switch means for shunting the latter to effect steady energization of said electrically energizable device through said time delay electrical actuating means.

5. Adaptor means for use with circuit means extending between a source of electrical potential and an electrically energizable device and including main switch means for closing the same, and for association with cyclic switch means adapted to be detachably connected with said adaptor in parallel relation therewith, comprising time delay electrical actuating means connected in series in said circuit means energizable by current flow therethrough from said source of potential to said electrically energizable device upon closing of said main switch, contact means in series with said circuit means and in shunt relation with said time delay electrical actuating means, said cyclic switch means when connected with said adaptor means opening said contact means, said cyclic switch means upon closing of said main switch means effecting intermittent energization of said electrically energizable device by said source of potential, said time delay electrical actuating means being energized by current flow from said source of potential to said electrically energizable device after a first predetermined interval of energization of said electrically energizable device through said cyclic switch means for shunting the latter to effect steady energization of said electrically energizable device through said time delay electrical actuating means, and said time delay electrical actuating means after a second predetermined interval subsequent to said first predetermined interval rendering shunting of said cyclic switch means ineffective and thereby effect intermittent energization of said electrically energizable device through said cyclic switch means.

6. For use in an engine powered vehicle having brake means applicable for braking the vehicle, accelerator means for controlling the engine of the vehicle, signal means comprising an electrically energizable filament and a source of electrical potential for energizing said filament, circuit means between said filament, ground and said electrical potential source, a first control switch in said circuit means having connection with said brake means and being adapted to be closed upon application of said brake means, a second control switch in said circuit means in parallel relation with said first control switch adapted to be closed upon predetermined movement of said accelerator means, the combination of adaptor means comprising a housing, time delay electrical actuating means in said housing connected in said circuit means and energizable by current flow therethrough from said source of potential upon closing of said first or second main control switches, normally closed contact means in series with said circuit means and in shunt relation with said time delay electrical actuating means, prong openings in said housing at said contact means, cyclic switch means having prong means insertable in said prong openings of said housing of said adaptor means for detachably connecting said cyclic switch means with said adaptor means and said prong means of said cyclic switch means when inserted in the openings of said housing of said adaptor means opening said contact means, said cyclic switch means upon closing of said first or second main control switch effecting intermittent energization of said filament by said source of potential, and said time delay electrical actuating means being energized by current flow from said source of potential to ground after a first predetermined interval of energization of said filament through said cyclic switch means for shunting the latter to effect steady energization of said filament through said time delay electrical actuating means, and said cyclic switch means upon removal of the same from said adaptor means providing for closing of said contact means of said adaptor means and thereby provide for the steady energization of said filament from said source of electrical potential upon closing of said first or second main control switches.

7. For use in an engine powered vehicle having brake means applicable for braking the vehicle, accelerator means for controlling the engine of the vehicle, signal means comprising an electrically energizable filament and a source of electrical potential for energizing said filament, circuit means between said filament and said electrical potential source, a first control switch in said circuit means having connection with said brake means and being adapted to be closed upon application of said brake means, a second control switch in said circuit means in parallel relation with said first control switch adapted to be closed upon predetermined movement of said accelerator means, the combination of adaptor means comprising a housing, time delay electrical actuating means in said housing connected in series in said circuit means and energizable by current flow therethrough from said source of potential to said filament upon closing of said first or second control switches, normally closed contact means in series with said circuit means and in shunt relation with said time delay electrical actuating means, prong openings in said housing at said contact means, cyclic switch means having prong means insertable in said prong openings of said housing of said adaptor means for detachably connecting said cyclic switch means with said adaptor means and said prong means of said cyclic switch means when inserted in the openings of said housing of said adaptor means opening said contact means, said cyclic switch means upon closing of said first or second main control switches effecting intermittent energization of said filament by said source of potential, and said time delay electrical actuating means being energized by current flow from said source of potential to said filament after a first predetermined interval of energization of said filament through said cyclic switch means for shunting the latter to effect steady energization of said filament through said time delay electrical actuating means, said time delay electrical actuating means after a second predetermined interval subsequent to said first predetermined interval rendering shunting of said cyclic switch means ineffective and thereby effect intermittent energization of said filament through said cyclic switch means, and said cyclic switch means upon removal of the same from said adaptor means providing for closing of said contact means of said adaptor means and thereby provide for the steady energization of said filament from said source of electrical potential upon closing of said first or second main control switches.

8. The combination of claim 6 characterized by the provision of second circuit means in parallel with the first circuit means, second signal means comprising second filament means in said second circuit means, normally closed switch means in said second circuit means, and means in said first circuit means for opening said last named switch means upon closing of said first or second control switches.

9. The combination of claim 7 characterized by the provision of second circuit means in parallel with the first circuit means, second signal means comprising second filament means in said second circuit means, normally closed switch means in said second circuit means, and means in said first circuit means for opening said last named switch means upon closing of said first or second control switches.

References Cited by the Examiner
UNITED STATES PATENTS

| | | | |
|---|---|---|---|
| 1,551,267 | 8/1925 | Schenck et al. | 200—51.1 |
| 1,711,397 | 4/1929 | Rumble | 200—51.1 |
| 1,885,714 | 11/1932 | Hampton | 340—72 X |

NEIL C. READ, *Primary Examiner.*

I. J. LEVIN, *Assistant Examiner.*